US008454736B2

(12) United States Patent
Bindas et al.

(10) Patent No.: US 8,454,736 B2
(45) Date of Patent: Jun. 4, 2013

(54) TRIPLE-FLOW VORTEX TUBE

(76) Inventors: Valeriy Grigoryevich Bindas, Krasnodar (RU); Eduard Vladimirovich Yuryev, Krasnodarskii Krai (RU)

( * ) Notice: Subject to any disclaimer, the term of this patent is extended or adjusted under 35 U.S.C. 154(b) by 0 days.

(21) Appl. No.: 13/569,497

(22) Filed: Aug. 8, 2012

(65) Prior Publication Data

US 2013/0031877 A1 Feb. 7, 2013

Related U.S. Application Data

(63) Continuation of application No. PCT/RU2011/000022, filed on Jan. 20, 2011.

(30) Foreign Application Priority Data

Feb. 8, 2010 (RU) .................................. 2010104422

(51) Int. Cl.
*B01D 45/12* (2006.01)
(52) U.S. Cl.
USPC ................... 96/306; 55/396; 55/456; 55/457; 95/34; 95/219; 95/269
(58) Field of Classification Search
CPC ...................................................... B01D 45/12
USPC ..................................... 55/336, 461
See application file for complete search history.

(56) References Cited

U.S. PATENT DOCUMENTS

| | | | | |
|---|---|---|---|---|
| 4,458,494 A * | 7/1984 | Fekete | | 62/5 |
| 5,976,227 A * | 11/1999 | Lorey | | 96/209 |
| 6,379,411 B1 * | 4/2002 | Turner et al. | | 55/394 |
| 6,430,937 B2 * | 8/2002 | Cho et al. | | 62/5 |
| 6,551,385 B2 * | 4/2003 | Turner et al. | | 95/269 |
| 6,821,322 B2 * | 11/2004 | Milia | | 96/209 |
| 6,932,858 B2 * | 8/2005 | Nicol et al. | | 95/269 |
| 7,726,135 B2 * | 6/2010 | Sullivan | | 62/5 |
| 2008/0173363 A1 * | 7/2008 | Betting | | 137/625.28 |

FOREIGN PATENT DOCUMENTS

| | | |
|---|---|---|
| GB | 1565982 A | 4/1980 |
| RU | 2170891 C1 | 7/2001 |
| RU | 2232359 C2 | 7/2004 |
| SU | 259772 * | 1/1968 |
| SU | 532385 A1 | 10/1976 |
| SU | 607603 A1 | 5/1978 |
| SU | 731992 A1 | 5/1980 |
| SU | 1078213 * | 3/1984 |

OTHER PUBLICATIONS

International Search Report from corresponding International Application PCT/RU2011/000022 filed on Jan. 20 2011, mailed on May 26, 2011.

* cited by examiner

Primary Examiner — Duane Smith
Assistant Examiner — Sonji Turner
(74) Attorney, Agent, or Firm — Patentbar International P.C.

(57) ABSTRACT

Devices for separating dispersed particles from gases or vapors by centrifugal force are disclosed. The vortex tube comprises a body, an inlet duct, outlet ducts for the cold and hot gases, a liquid discharge duct, and a power separator. The inlet duct has a device for the introduction of methanol. The body comprises a vortex generator at the inlet duct. The body comprises a separator and a diaphragm with an inner conical surface, both defining an annular channel. The surface of the streamlined end of the separator comprises flutes. The separator is mounted to be capable of moving along the axis of the body and is pressed against the diaphragm by a spring. The inner portion of the body and the outer portion of the separator define a liquid chamber. A vortex reducer having a cross shape is mounted on the end of the power separator opposite the body.

3 Claims, 2 Drawing Sheets

TRIPLE-FLOW VORTEX TUBE

RELATED APPLICATIONS

This Application is a Continuation application of International Application PCT/RU2011/000022 filed on Jan. 20, 2011, which in turn claims priority to Russian application No. RU2010104422 filed on Feb. 8, 2010, both of which are incorporated herein by reference in their entirety.

FIELD OF THE INVENTION

The invention is in the field of low-temperature treatment and separation (apparatuses for separation of dispersed particles of gases or vapors using centrifugal force, generated by turning of the gas flow direction), and can be used in the power generation, oil refining, petrochemical, and chemical industries.

BACKGROUND OF THE INVENTION

A direct-flow separator is known (USSR inventor's certificate No. 532385, IPC B01D45/12, published 1976.10.25 [1]), comprising a body with a recess, cross baffle provided with deflectors, and inlet and outlet ducts.

The disadvantage of this apparatus is the low efficiency of liquid fraction withdrawal when it flows off the guide tube for straightening of the flow at the outlet.

An apparatus is known for thickening of the hydraulic fluid (USSR inventor's certificate No. 607603, IPC B0105/103, published 1978.05.25 [2]), comprising a casing, discharge chamber, discharge ducts, and guide fins.

The disadvantage of this apparatus is the nature of its screw-shaped guide fins, which do not provide sufficient vortex efficiency.

The closest approach to the present invention is a vortex separator (USSR inventor's certificate No. 731992, IPC B01D45/12, published 1980.05.05 [3]), comprising a body with ducts for gas mixture supply and condensate discharge, inlet chamber with a nozzle atomizer, and a vortex chamber.

The disadvantage of this apparatus is that it is impossible to collect the liquid fraction released while the cold gas is flowing out of the orifice with the cold gas outlet duct and that separation of the liquid fraction from the gas during transfer from the additional vortex chamber to the separation duct is not efficient enough.

SUMMARY OF THE INVENTION

The technical result provided by the proposed invention is greater efficiency of separation of dispersed particles from gases or vapors.

Essence of the invention consists in that the triple-flow vortex tube has a body, inlet duct, outlet ducts for the cold and hot gases, liquid discharge duct, and a power separator. Wherein:

The inlet duct is equipped with a device for methanol introduction;

A vortex generator in the form of the Archimedean spiral is located in the body at the inlet duct, A separator and a diaphragm with the conical inner surface, which form an annular channel, are located inside the body. The surface of the streamlined end of the separator comprises flutes. Number of the flutes is from 2 to 0.2 D, where D is the diameter of the power separator in mm; flute depth is 0.05 D-0.1 D; flute width c is 0.05 D-0.2 D; radius of curvature of the flute r is 3 D-3.5 D; and angle of deflection of the flute a is 30-75°. The separator is mounted so as to be capable of moving along the axis of the body and is pressed against the diaphragm by a spring with the force G, defined by the formula:

$$G = \frac{\rho v^2}{2} \times S \times \cos f,$$

where $\rho$ is the gas flow density (kg/m$^3$); v is the gas flow speed (m/s); S is the area of the streamlined end of the separator (m$^2$); Cos f is the cosine of the gas flow incidence angle, The inner portion of the body and the outer portion of the separator define the liquid chamber, A vortex reducer having a cross shape is located on the end of the power separator opposite the body and mounted at a distance of at least 5 and not than 12 power separator diameters D to the body end. The end faces of the vortex reducer have protrusions on each edge, height L of each protrusion being selected from the range of 1 H-1.5 H, where H is the thickness of the vortex reducer's material.

Methanol introduction device can be made as a tube drilled-in on the side of the inlet duct or as an ejector.

Analysis of the state of the art performed by the claimer including the search by patent and scientific-and-technical sources of information as well as identification of sources containing the information on analogue of the claimed invention, allowed the statement that the claimer did not uncover technical solution characterized by features similar or equivalent to the proposed ones.

DETAILED DESCRIPTION OF THE PREFERRED EMBODIMENTS

Figure 1:
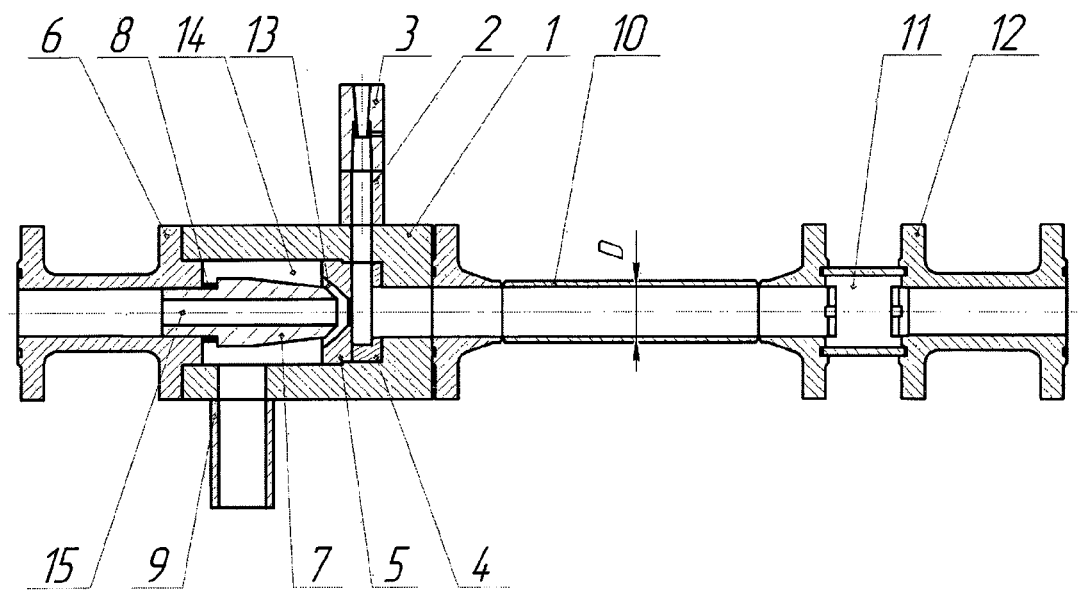
FIG. 1 shows a general view of the triple-flow vortex tube, longitudinal section.

Triple-flow vortex tube (FIG. 1) comprises a cylindrical body 1, to which an inlet duct 2 provided with a methanol introduction device 3 is connected. Methanol introduction device 3 provides introduction of methanol into the flow and prevents freezing of the dropping liquid.

A vortex generator 4 made in the form of the Archimedean spiral and a diaphragm 5 with the inner conical surface are coaxially mounted in the body 1. Cold gas outlet duct 6 mounted on one face of the body 1. The opposite face of the body 1 is connected to the face of the power separator 10, whose other face is connected to the vortex reducer 11, to which the hot gas outlet duct 12 is coaxially fitted. Liquid discharge duct 9 is fitted to the body 1 on its cylindrical surface.

Location of the diaphragm 5 inside the body 1 allows separation of the hot and cold gases, and the conical shape of the surface of the diaphragm 5 allows smooth flowing-down of the condensed liquid to the annular channel 13.

Figure 2:
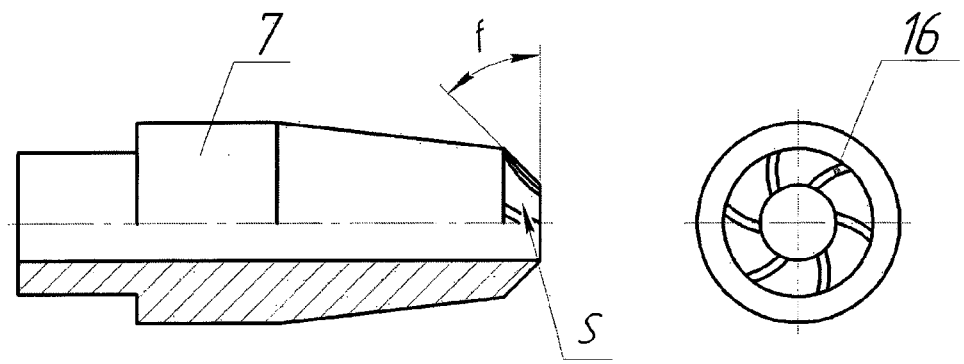
FIG. 2 shows a separator, side view and streamlined end view.

Separator 7 is mounted in the cold gas outlet duct 6 in axial alignment with the body 1. Outer surface of the separator and the inner surface of the body define a liquid chamber 14. A spring 8 is mounted on the separator 7, the spring being pressing its streamline end against the diaphragm 5. Pressing force G of the spring 8 is determined by the following formula:

$$G = \frac{\rho v^2}{2} \times S \times \cos f,$$

where $\rho$ is the gas flow density (kg/m3); v is the gas flow speed (m/s); S is the area of the streamlined end of the separator (m²); Cos f is the cosine of the gas flow incidence angle (see FIG. 2).

Surface of the streamlined end of the separator 7 comprises flutes 16 (FIG. 2), which allow additional directional collection of the liquid fraction and vortex reduction at the gas escape through the annular channel 13, which contributes to a greater efficiency in the cleaning of gas from the dropping liquid.

Figure 3:
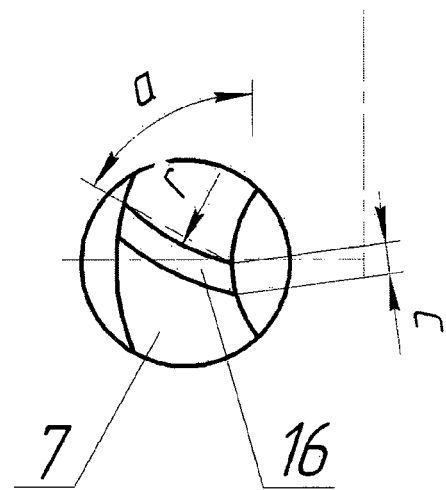
FIG. 3 shows a flute on the separator (enlarged)

Parameters of the flutes 16 for the separator 7 can be selected from the following range of values (see FIG. 3):
Number of flutes is from 2 to 0.2 D, where D is the diameter of the power separator 10 in mm;
Flute depth is 0.05 D-0.1 D;
Flute width (c) is 0.05 D-0.2 D;
Radius of curvature of the flute (r) is 3 D-3.5 D;
Angle of deflection of the flute (a) is 30-75°.

Figure 4:
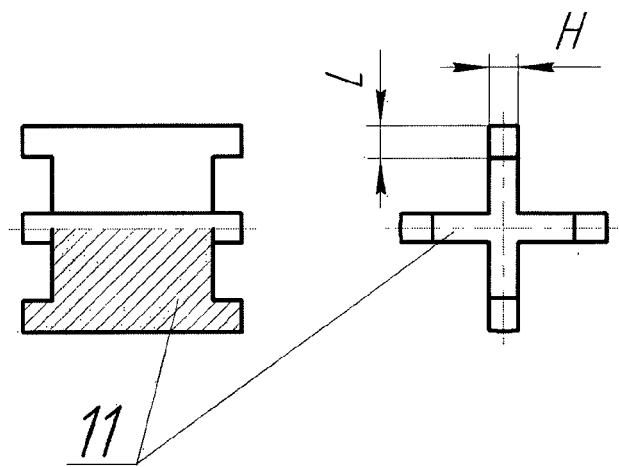
FIG. 4 shows a vortex reducer.

Vortex reducer 11 is cross-shaped (FIG. 4) and is mounted at a distance of at least 5 and more than 12 diameters of the power separator D to the end of the body 1. The end faces of the vortex reducer 11 have protrusions on each edge, height L of each protrusion being selected from the range of 1 H-1.5 H, where H is the thickness of the material for the vortex reducer 11.

The vortex reducer 11 is designed for decelerating the mixture of the gas-liquid flow and separation of the compressed gas into the straight-flow hot gas and the counter-flow cold gas. Presence of protrusions on each face end of the vortex reducer 11 allows an increase in the gas flow area and contributes to separation of gas and dropping liquid.

Upon experiments, the inventors found that the above ranges of numeric values for parameters of the flutes 16 of the separator 7 and vortex reducer 11 are optimal to achieve the technical result—improvement in the separation efficiency. The table at the end of description shows the results obtained in the course of experimental studies of the efficiency values for the vortex tube versus its geometrics.

Triple-flow vortex tube operates as follows.

Compressed gas is supplied through the inlet duct 2 to the vortex generator 4 made in the form of the Archimedean spiral. Under the action of the centrifugal force and the vortex generator 4, the gas acquires a vortex-shaped structure and is routed to the power separator 10.

Availability of the vortex reducer 11 results in separation of the vortex gas flow within the power separator 10 into two flows: axial counter-flow vortex and wall straight-flow vortex. Power separation occurs due to the friction of the axial counter-flow vortex on the wall straight-flow vortex and due to the action of centrifugal force. Due to this process, the gas is separated into the hot gas passing through the vortex reducer 11 and the hot gas outlet duct 12, and the cold gas, which is routed by the axial counter-flow vortex to the diaphragm 5 with the inner conical surface. While passing through the diaphragm 5, the cold gas carries the smallest liquid drops therein. Since the density of the liquid is higher than that of the gas and the cold gas flow is under the action of centrifugal force, the smallest liquid drops settle on the inner surface of the diaphragm 5 and flow off through the annular channel 13 to the liquid chamber 14, from where the separated liquid flows through the liquid discharge duct 9. The cold gas that doesn't contain the liquid flows through the inner cavity 15 of the separator 7. Further, the cleaned cold gas is removed from the device through the cold gas outlet duct 6.

Location of the separator 7 that along with the diaphragm 5 defines the annular channel 13 for separation of the liquid fraction within the body 1 allows separation of the liquid, released in the process of condensation by decreasing the compressed gas temperature at the inlet, from the cold gas and removal of it from the high speed area in the cold gas outlet section.

Flutes 16 ensure direction of the flow along the optimal trajectory due to formation of local resistance in the flow, which results not only in the reduction of hydraulic losses in the annular channel 13 but also in the optimal distribution of the liquid in the gas flow at the inlet of the liquid chamber 14. Furthermore, flutes 16 act as a coalescer for liquid drops in the gas flow, which allows improvement in the coalescence of the liquid drops without additional power consumption.

Availability of the liquid chamber 14 defined by the inner surface of the body 1 and the outer surface of the separator 7 allows a buffer zone for liquid stabilization after its passage through the annular channel 13 for separation of the liquid fraction.

Making of the vortex generator 4 in the form of the Archimedean spiral provides the optimal flow vortex resulting in a stable flow of the hot and cold gases in the wall and axial areas of the power separator 10.

The claimed technical result "improvement in the efficiency of separation of dispersed particles from gases or vapors" is achieved by the triple-flow vortex tube comprising a body, inlet duct, outlet ducts for cold and hot gases, liquid discharge duct, and a power separator. Wherein:
The inlet duct is equipped with a device for methanol introduction;
A vortex generator in the form of the Archimedean spiral is located in the body at the inlet duct,
A separator and a diaphragm with the conical inner surface, which form an annular channel, are located inside the body. The surface of the streamlined end of the separator comprises flutes. Number of the flutes is from 2 to 0.2 D, where D is the diameter of the power separator in mm; flute depth is 0.05 D-0.1 D; flute width c is 0.05 D-0.2 D; radius of curvature of the flute r is 3 D-3.5 D; and angle of deflection of the flute a is 30-75°. The separator is mounted so as to be capable of moving along the axis of the body and is pressed against the diaphragm by a spring with the force G, defined by the formula:

$$G = \frac{\rho v^2}{2} \times S \times \cos f,$$

where ρ is the gas flow density (kg/m³); v is the gas flow speed (m/s); S is the area of the streamlined end of the separator (m²); Cosf is the cosine of the gas flow incidence angle,
The inner portion of the body and the outer portion of the separator define the liquid chamber,
A vortex reducer having a cross shape is located on the end of the power separator opposite the body and mounted at a distance of at least 5 and not than 12 power separator diameters D to the body end. The end faces of the vortex reducer have protrusions on each edge, height L of each protrusion being selected from the range of 1 H-1.5 H, where H is the thickness of the vortex reducer's material.

The claimed triple-flow vortex tube is embodied using commercially available materials, can be fabricated by any machine-building plant, and will find extensive application in power generation, oil refining, petrochemical, and chemical industries.

REFERENCES

1. USSR inventor's certificate No. 532385, IPC B01D45/12, published 1976.10.25.
2. USSR inventor's certificate No. 607603, IPC B0105/103, published 1978.05.25
3. USSR inventor's certificate No. 731992, IPC B01D45/12, published 1980.05.05

| | | Values | | | | | | | | | | | | | | | | | |
|---|---|---|---|---|---|---|---|---|---|---|---|---|---|---|---|---|---|---|---|
| | | Flutes qty | | | | Flute width | | | | Flute depth | | | Radius | | | Corner, degrees | | | | Vortex reducer | | | |
| | | 0 | 1 | 2 | 0.2D | 0.05D | 0.1D | 0.15D | 0.2D | 0.05D | 0.075D | 0.1D | 3D | 3.25D | 3.5D | 30 | 40 | 60 | 75 | 5D | 7D | 9D | 12D |
| Values | | | | | | | | | | Efficiency, % | | | | | | | | | | | | | |
| Flutes qty | 0 | — | — | — | — | — | — | — | — | — | — | — | — | — | — | — | — | — | — | 70 | 85 | 97 | 94 |
| | 1 | | | | | 71 | 78 | 82 | 87 | 71 | 84 | 93 | 87 | 95 | 98 | 91 | 96 | 99 | 94 | 71 | 85 | 98 | 95 |
| | 2 | | | | | 73 | 80 | 83 | 89 | 73 | 85 | 94 | 87 | 96 | 97 | 92 | 96 | 99 | 93 | 71 | 85 | 98 | 95 |
| | 0.2D | | | | | 78 | 82 | 88 | 93 | 75 | 89 | 97 | 92 | 99 | 96 | 95 | 96 | 98 | 90 | 72 | 84 | 97 | 95 |
| Flute width | 0.05D | | | | | | | | | 72 | 82 | 91 | 93 | 97 | 95 | 95 | 96 | 97 | 92 | 73 | 85 | 98 | 96 |
| | 0.1D | | | | | | | | | 75 | 85 | 93 | 93 | 98 | 95 | 96 | 97 | 98 | 93 | 75 | 86 | 99 | 96 |
| | 0.15D | | | | | | | | | 75 | 85 | 95 | 94 | 99 | 97 | 97 | 99 | 99 | 93 | 75 | 87 | 99 | 96 |
| | 0.2D | | | | | | | | | 77 | 87 | 97 | 95 | 99 | 97 | 99 | 99 | 99 | 93 | 76 | 88 | 99 | 96 |
| Flute depth | 0.05D | | | | | | | | | | | | 95 | 98 | 96 | 95 | 97 | 98 | 93 | 77 | 88 | 99 | 96 |
| | 0.075D | | | | | | | | | | | | 98 | 99 | 98 | 97 | 98 | 99 | 93 | 77 | 88 | 99 | 95 |
| | 0.1D | | | | | | | | | | | | 99 | 99 | 99 | 99 | 99 | 99 | 91 | 78 | 90 | 99 | 95 |
| Radius | 3D | | | | | | | | | | | | | | | 96 | 98 | 99 | 93 | 78 | 93 | 99 | 96 |
| | 3.25D | | | | | | | | | | | | | | | 96 | 98 | 99 | 92 | 79 | 95 | 99 | 96 |
| | 3.5D | | | | | | | | | | | | | | | 96 | 97 | 98 | 92 | 78 | 91 | 99 | 95 |
| Angle, degree | 30 | | | | | | | | | | | | | | | | | | | 79 | 91 | 98 | 96 |
| | 40 | | | | | | | | | | | | | | | | | | | 79 | 96 | 99 | 95 |
| | 60 | | | | | | | | | | | | | | | | | | | 83 | 97 | 99 | 95 |
| | 75 | | | | | | | | | | | | | | | | | | | 77 | 91 | 97 | 94 |

What is claimed is:

1. A triple-flow vortex tube comprising:

a body characterized by its axis, an inlet duct equipped with a device for methanol introduction, outlet ducts for the cold and hot gases, a liquid discharge duct, and a power separator;

a vortex generator in the form of an Archimedean spiral located in a body at the inlet duct;

the body comprising a separator having a streamlined end and a diaphragm having an conical inner surface, the separator and the diaphragm forming an annular channel, a surface of the streamlined end of the separator comprising the flutes numbering from 2 to 0.2 D, where D is a diameter of the power separator in mm; a flute depth is 0.05 D-0.1 D; a flute width c=0.05 D-0.2 D; a radius of a curvature of the flute r=3 D-3.5 D, and an angle of deflection of the flute a=30-75°; the separator being mounted so as to be capable of moving along the axis of the body, the separator being pressed against the diaphragm by a spring with a force G, defined by a formula $$G = \frac{\rho v^2}{2} \times S \times \cos f,$$

where $\rho$ is a gas flow density; v is the gas flow speed; S is an area of the streamlined end of the separator; Cos f is a cosine of a gas flow incidence angle;

the inner portion of the body and the outer portion of the separator define a liquid chamber; and a vortex reducer having a cross-like shape and being located at an end of the power separator opposite to the body and mounted at a distance of at least 5 and no greater than 12 power separator diameters D to the body end, wherein the end faces of the vortex reducer have protrusions on each edge, a height L of each protrusion being selected from a range of 1 H to 1.5 H, wherein H is a thickness of a material of the vortex reducer.

2. The triple-flow vortex tube of claim 1, wherein the methanol introduction device is made as a tube drilled-in on the side of the inlet duct or as an ejector.

3. The triple-flow vortex tube of claim 1, wherein the methanol introduction device is made as an ejector.

* * * * *